US010460137B1

(12) United States Patent
Landry, Sr. et al.

(10) Patent No.: US 10,460,137 B1
(45) Date of Patent: Oct. 29, 2019

(54) DYNAMIC RFID TAG SINGULATION USING STATE INFORMATION MASKING

(71) Applicant: Amazon Technologies, Inc., Seattle, WA (US)

(72) Inventors: Joshua David Landry, Sr., Auburn, WA (US); Christopher Raymond Grajewski, Seattle, WA (US); Oleg Kantor, Kirkland, WA (US); Tak Keung Joseph Lui, Bellevue, WA (US); David Bruce McCalib, Jr., Seattle, WA (US); Roman Shmulevich, Woodbridge (CA); Alton Paul Werronen, Auburn, WA (US); Fabien Lepoutre, San Jose, CA (US); Mark G. McDonald, San Jose, CA (US); Patrick Rubin, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 52 days.

(21) Appl. No.: 15/890,883

(22) Filed: Feb. 7, 2018

(51) Int. Cl.
*G06K 19/07* (2006.01)
*G06K 7/10* (2006.01)

(52) U.S. Cl.
CPC ..... *G06K 7/10445* (2013.01); *G06K 7/10475* (2013.01); *G06K 19/0723* (2013.01)

(58) Field of Classification Search
None
See application file for complete search history.

(56) References Cited

U.S. PATENT DOCUMENTS

| 2004/0145454 | A1* | 7/2004 | Powell | G06K 7/0008 |
| | | | | 340/10.2 |
| 2006/0289641 | A1* | 12/2006 | Roesner | G06K 19/0723 |
| | | | | 235/435 |
| 2008/0001723 | A1* | 1/2008 | Schuessler | G06F 11/1004 |
| | | | | 340/10.51 |
| 2008/0144358 | A1* | 6/2008 | Smith | G06K 19/0701 |
| | | | | 365/149 |

(Continued)

OTHER PUBLICATIONS

The Global Language of Business, "EPC Tag Data Standard defines the Electronic Product Code and specifies the memory contents of Gen 2 RFID Tags," Release 1.11, Ratified, Sep. 2017, 2074 pages.

(Continued)

*Primary Examiner* — Christle I Marshall
(74) *Attorney, Agent, or Firm* — Patterson + Sheridan, LLP (57) ABSTRACT

A method of interrogating a plurality of RFID tags comprises interrogating a first RFID tag with a read command comprising a masking value for a predefined portion of a User Memory Bank of the first RFID tag. The predefined portion stores state information for the first RFID tag. The masking value corresponds to a non-quiesced state relative to the read command interrogation. The method further comprises receiving a response from the first RFID tag that indicates that the first RFID tag is in the non-quiesced state. The method further comprises interrogating the first RFID tag with a write command that instructs the first RFID tag to write a predefined value to the predefined portion of the User Memory Bank, wherein writing the predefined value to the predefined portion places the first RFID tag in a quiesced state relative to a subsequent read command interrogation comprising the masking value.

20 Claims, 7 Drawing Sheets

(56) References Cited

U.S. PATENT DOCUMENTS

2016/0180123 A1* 6/2016 Forster .............. G06K 19/0726
340/10.51
2017/0046543 A1* 2/2017 Shimada .................. G06K 7/10

OTHER PUBLICATIONS

EPCglobal Gent Specification, "EPC Radio-Frequency Identity Protocols Generation-2 UHF RFID," specification for RFID Air Interfance, Protocol for Communications at 860 MHz-960 MHz, Version 2.01, Apr. 2015, 152 pages.

* cited by examiner

| RFID TAG | STATE | RESPOND TO INVENTORY? | WRITE |
|---|---|---|---|
| 205-1 | 0XFFFF | NO | N/A |
| 205-2 | 0X0000 | YES | 0XFFFF |
| ⋮ | | | |
| 205-P | 0X0000 | YES | 0XFFFF |

MASKING VALUE: 0X0000 ← 525

FIG. 6

| RFID TAG | STATE (1ST) | STATE (2D) | STATE (3D) | STATE (FINAL) |
|---|---|---|---|---|
| 205-1 | 0X0000 | 0X00F0 | 0X0FF0 | 0XFFFF |
| 205-2 | 0X0000 | 0X0FF0 | 0X0FF0 | 0XFFFF |
| 205-3 | 0X0000 | 0XFFFF | 0XFFFF | 0XFFFF |
| ⋮ | | | | |
| 205-P | 0X0FF0 | 0X0FF0 | 0X0FF0 | 0XFFFF |

| | MASKING VALUE | |
|---|---|---|
| 1ST INVENTORY (1ST READER) | 0X0000 | ← 630 |
| 2D INVENTORY (2D READER) | 0X00F0 | ← 635 |
| 3D INVENTORY (3D READER) | 0X0FF0 | ← 640 |

FIG. 7

DYNAMIC RFID TAG SINGULATION USING STATE INFORMATION MASKING

BACKGROUND

The present disclosure relates to performing singulation of radio frequency identification (RFID) tags using stored state information.

Shipping packages typically involves moving the packages to different locations in a shipping warehouse in preparation for the packages being loaded onto trucks or other transport vehicles for external distribution. Shipping warehouses can use RFID systems to track inventory. RFID tags, which can be passive or active, may be included with or disposed on the inventory (e.g., individual packages or pallets) in the warehouse and are typically programmed with information identifying the associated inventory item(s). The identifying information may be read from the RFID tags by RFID readers disposed throughout the shipping warehouse. In one example, RFID readers may be located at loading docks or along conveyor systems so that the RFID system can detect when RFID tags (and the corresponding inventory) pass through.

The performance of a particular RFID reader when communicating with RFID tags may depend on multiple factors. In some cases, RFID reader performance may be expressed as a number of tag reads per second. Within "dense" RFID environments having large populations of RFID tags, a RFID reader may experience a substantial decrease in performance, in some cases as drastic as a third-order exponential decay in tag reads per second for increasing numbers of RFID tags. One reason for the performance decrease can be attributed to the number of reads of already-identified RFID tags during inventorying operations.

BRIEF DESCRIPTION OF DRAWINGS

Various embodiments in accordance with the present disclosure will be described with reference to the drawings, where like designations denote like elements.

DETAILED DESCRIPTION

According to embodiments described herein, a RFID tag stores state information within a predefined portion of its non-volatile memory (NVM). In some embodiments, the predefined portion may be included in a User Memory Bank of the NVM. While interrogating a plurality of RFID tags, a RFID reader may determine based on the state information that a particular RFID tag is in a non-quiesced state relative to the interrogation. The RFID reader may update the state information of the RFID tag, wherein the updated state information places the RFID tag in a quiesced state relative to a subsequent interrogation by the RFID reader.

In some embodiments, the RFID reader is configured to interrogate with a read command comprising a masking value for the predefined portion of the NVM. The masking value corresponds to a non-quiesced state relative to the read command interrogation. As discussed herein, a "non-quiesced state" refers to a state of the RFID tag in which the RFID tag provides a response (such as a tag reply) to an interrogation with a read command comprising a particular masking value. In contrast, a "quiesced state" refers to a state of the RFID tag in which the RFID tag does not provide a response to the interrogation with the read command comprising the masking value.

When the RFID reader receives a response from a RFID tag, this indicates that the RFID tag is in the non-quiesced state. The RFID reader is further configured to receive identification information for the RFID tag, and to update a listing of identified tags using the identification information. The RFID reader is further configured to interrogate the RFID tag with a write command comprising writing a predefined value to the predefined portion, wherein writing the predefined value to the predefined portion places the RFID tag in a quiesced state relative to a subsequent read command interrogation comprising the masking value.

Beneficially, RFID tags that are identified by a RFID reader during an interrogation may be excluded from responding during subsequent interrogations. By doing so, the RFID reader performance may be increased as the number of reads of already-identified RFID tags during an inventory may be substantially reduced or even eliminated. Stated another way, the tag reads performed by the RFID reader are more likely to correspond to RFID tags of interest (e.g., RFID tags that have yet to be identified), which results in a reduced time to complete an inventory of the plurality of RFID tags.

Figure 1:
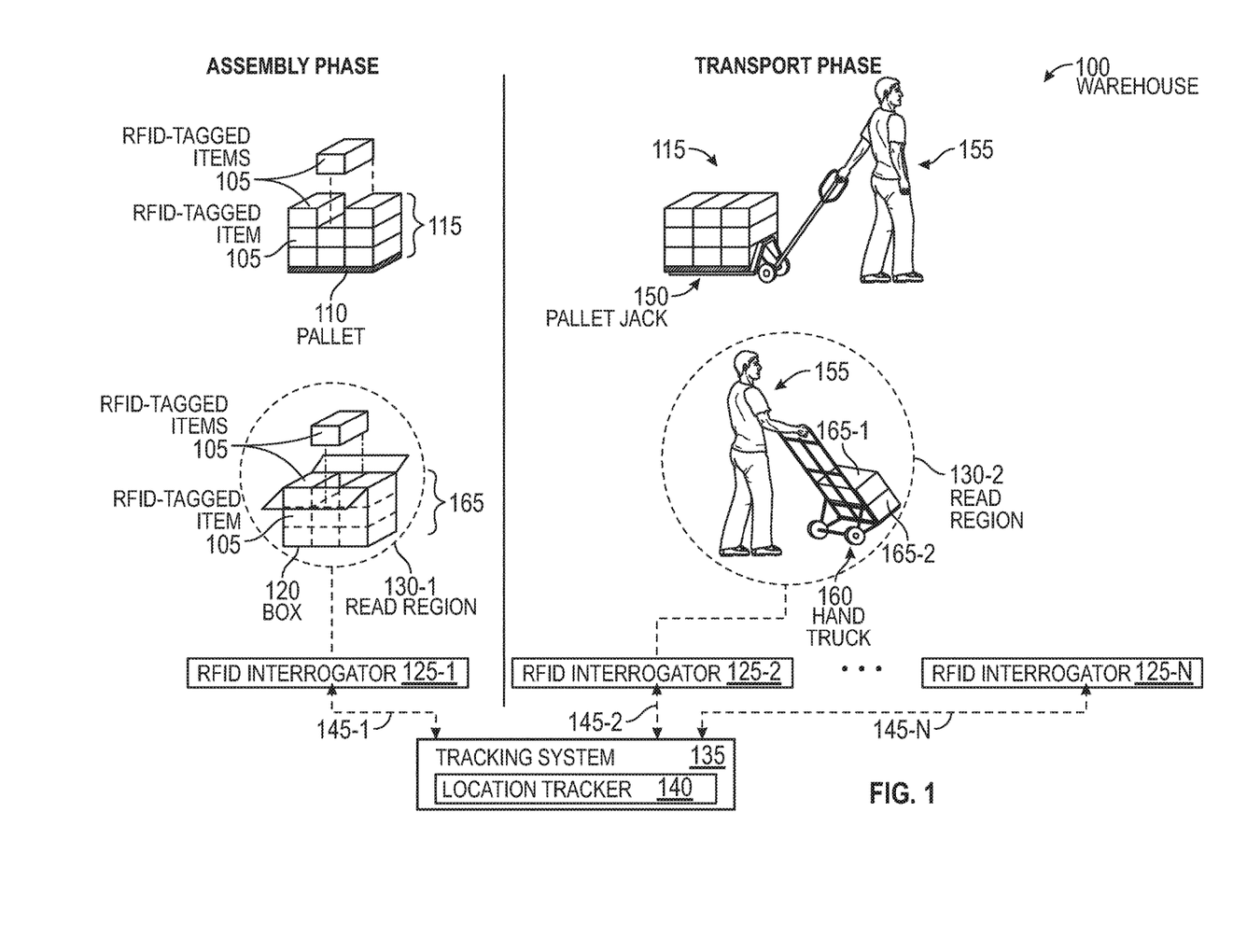
FIG. 1 illustrates exemplary operations within a warehouse having a plurality of RFID readers, according to various embodiments.

FIG. 1 illustrates exemplary operations within a warehouse 100 having a plurality of RFID readers, according to various embodiments. The operations may be included in any suitable phase(s) of warehouse operations known to a person of ordinary skill in the art. The warehouse operations may comprise an assembly phase in which multiple RFID-tagged items 105 are grouped together, e.g., on a pallet 110 or in a box 120. The warehouse operations may further comprise a transport phase in which the multiple RFID-tagged items 105 (e.g., in the form of palletized items 115 or boxed items 165) are moved throughout the warehouse 100 by various means. Other examples of suitable warehouse operations may include staging at loading zones or other predefined regions within the warehouse, loading onto and/or off vehicles, and so forth.

The warehouse 100 comprises a plurality of RFID interrogators 125-1, 125-2, . . . , 125-N (generically referred to as a RFID interrogator 125), each of which includes at least one RFID reader and an antenna for detecting RFID tags that are included with the RFID-tagged items 105. The RFID interrogator 125 may have any suitable implementation, such as a device statically located in the warehouse 100 (e.g., a RFID portal disposed at a dock door near floor level, disposed overhead, and so forth), a movable device, and a worn or carried device. In some embodiments, at least one RFID interrogator 125 of the plurality of RFID interrogators 125 comprises multiple RFID readers that operate in conjunction with each other.

For example, an associate may move the palletized items 115 into or through a predefined region of the warehouse 100 (e.g., a loading zone in front of a dock door), which is within wireless range of the antenna and RFID reader in the RFID interrogator 125. As such, the RFID reader can receive unique identification information from the RFID-tagged items 105, which can be used to track the RFID-tagged items 105 as they move throughout the warehouse 100. In one embodiment, the RFID interrogators 125 forward the unique identification information to a tracking system 135 that includes a location tracker 140 configured to map the unique identification information to the RFID-tagged items 105 to identify the current location of the RFID-tagged items 105 in the warehouse 100. The tracking system 135 may have any suitable implementation, such as an inventory tracking system of the warehouse 100 or of a fulfillment center, a material handling system of a manufacturing facility, and so forth. Moreover, the location tracker 140 can compare the current locations of the RFID-tagged items 105 as reported by the RFID interrogators 125 to a desired location of the RFID-tagged items 105. For example, the RFID-tagged items 105 in the palletized items 115 may be located at a loading zone in front of a particular dock door, and may be detected by an RFID interrogator 125 disposed nearby. However, the location tracker 140 may determine that the associate should have moved the palletized items 115 to a different loading zone for a different dock door (e.g., for loading onto a different truck). As such, the location tracker 140 may provide feedback to the associate to move the palletized items 115 to the correct loading zone.

During the assembly phase, a plurality of RFID-tagged items 105 may be grouped together on a pallet 110 or in a box 120. In some embodiments, the RFID-tagged items 105 may be packages containing other items. The assembly phase may be performed using any suitable means, such as by an associate that manually adds RFID-tagged items 105 to the pallet 110 or the box 120, by mechanical means such as conveyors, and/or by robotic means.

The assembly phase may be performed within range of a first RFID interrogator 125-1 having a corresponding read region 130-1. The first RFID interrogator 125-1 may be communicatively coupled with the tracking system 135 via a communication link 145-1. Thus, the first RFID interrogator 125-1 may be configured to occasionally or periodically interrogate the plurality of RFID-tagged items 105, and to communicate changes in the composition of RFID-tagged items 105 to the tracking system 135.

Based on the disposition of the RFID interrogators 125 within the warehouse 100, the ranges of different RFID interrogators 125 may overlap, such that multiple RFID interrogators 125 may detect the same RFID-tagged items 105. In some embodiments, one or more deconfliction techniques may be performed to assign one RFID interrogator 125 to performing the interrogating of the RFID-tagged items 105.

During the transport phase, the palletized items 115 or boxed items 165 may be moved within the warehouse 100 using any suitable means. As shown, the palletized items 115 may be moved by an associate 155 using a pallet jack 150, or the boxed items 165 may be moved by the associate 155 using a hand truck 160. Although examples of manual movement of the palletized items 115 or boxed items 165 are provided, the person of ordinary skill in the art will recognize that other types of movement of the plurality of RFID-tagged items 105 are also possible. For example, the transport phase may include mechanical movement (e.g., using conveyors), motorized movement (e.g., using forklifts or carts), robotic movement, and so forth.

During transport within the warehouse 100, the palletized items 115 or boxed items 165 may pass through a read region 130-2 of a second RFID interrogator 125-2. The second RFID interrogator 125-2 may be communicatively coupled with the tracking system 135 via a communication link 145-2. Thus, the second RFID interrogator 125-2 may be configured to interrogate the plurality of RFID-tagged items 105 included in the palletized items 115 or boxed items 165, and to communicate the composition of RFID-tagged items 105 to the tracking system 135.

Whether the plurality of RFID-tagged items 105 are stationary or moving through the warehouse 100, a particular RFID interrogator 125 may continue to detect the plurality of RFID-tagged items 105 when performing additional read cycles. As discussed above, the performance of the RFID interrogator 125 may experience a substantial decrease due in part to reading the same RFID-tagged items 105 during interrogation processes.

Although described in the specific context of the warehouse 100, the person of ordinary skill will understand that the techniques described herein may be applied to other environments in which a plurality of RFID tags are aggregated. Some non-limiting examples include a manufacturing facility in which component parts are tracked using RFID tags, a commercial facility in which RFID-tagged items may be purchased or rented by customers, a library in which books or other media are tracked using RFID tags, and so forth.

Figure 2:
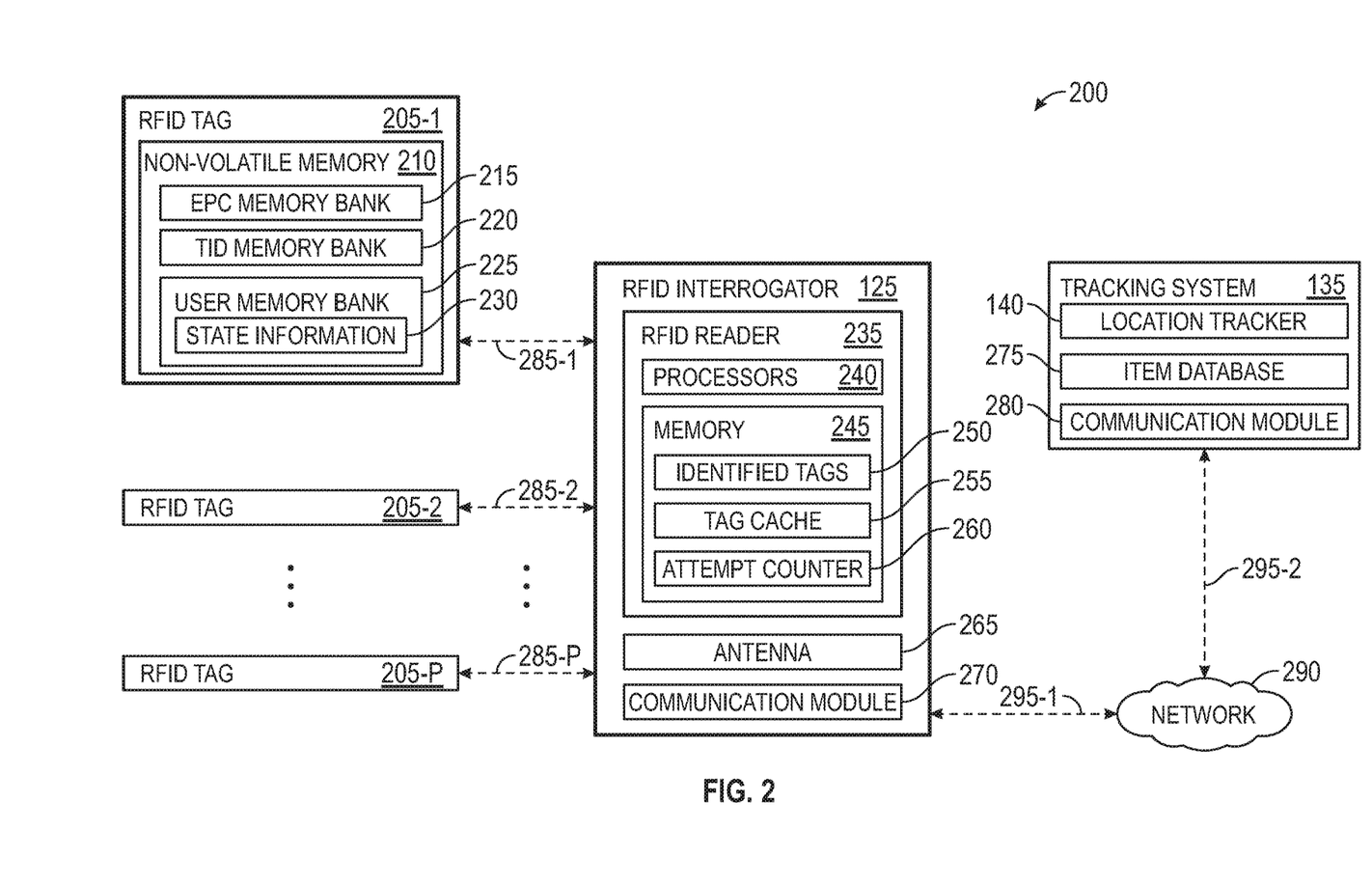
FIG. 2 is a block diagram of an exemplary system for tracking RFID-tagged items in a warehouse, according to various embodiments.

FIG. 2 is a block diagram of an exemplary system 200 for tracking RFID-tagged items in a warehouse, according to various embodiments. The system 200 may be used in conjunction with other embodiments described herein, such as implemented in the warehouse 100 depicted in FIG. 1.

The system 200 comprises a plurality of RFID tags 205-1, 205-2, . . . , 205-P communicatively coupled with the RFID interrogator 125 via respective communication links 285-1, 285-2, . . . , 285-P. The RFID tags 205-1, 205-2, . . . , 205-P may generally be affixed to items or packages of items, such as the RFID-tagged items 105 of FIG. 1. The system 200 further comprises the tracking system 135 communicatively coupled with the RFID interrogator 125 via a network 290.

As shown, the RFID tag 205-1 comprises a non-volatile memory (NVM) 210. The NVM 210 comprises an Electronic Product Code (EPC) Memory Bank 215, a Tag Identification (TID) Memory Bank 220, and a User Memory Bank 225. The EPC Memory Bank 215 may store an Electronic Product Code for the RFID tag 205-1, which is a globally unique identifier for the physical object to which the RFID tag 205-1 is affixed. The EPC Memory Bank 215 may further store control information, such as a Cyclic Redundancy Check (CRC) value, Protocol Control bits, and a filter value providing a means to improve tag read efficiency by selecting a subset of tags of interest. The TID Memory Bank 220 may store Tag Identification bits providing information about the RFID tag 205-1 itself, as opposed to the physical object to which the RFID tag 205-1 is affixed. The User Memory Bank 225 may be a variable size memory configured to store additional data attributes related to the physical object identified in the EPC Memory Bank 215.

State information 230 for the RFID tag 205-1 may be stored in a predefined portion of the NVM 210. In some embodiments, state information 230 for the RFID tag 205-1 is stored in the User Memory Bank 225. The size of the predefined portion may be selected based on a number of allowable states for the RFID tag 205-1. For example, in a case where the RFID tag 205-1 has only two allowable predefined states, such as an unread (or not inventoried) state and a read (or inventoried) state, the predefined portion may be as small as a single bit within the NVM 210. However, in cases where the RFID tag 205-1 has more than two allowable predefined states, the predefined portion may include a plurality of bits, byte(s), word(s), and so forth. In some embodiments, the predefined portion is a first word of the User Memory Bank 225, although other sizes and locations of the predefined portion are also possible.

In some embodiments, the different predefined states may correspond to different stages of handling or processing (e.g., within the warehouse). For example, a first state may indicate that the RFID tag 205-1 is in an initial unread state, a second state may indicate that the RFID tag 205-1 has been read (or otherwise processed) by a first RFID reader 235 at a first station or location, a third state may indicate that the RFID tag 205-1 has been read (or otherwise processed) by a second RFID reader 235 at a second station or location, and so forth.

In some embodiments, the state information 230 for the RFID tag 205-1 indicates a first state corresponding to a default factory setting. For example, the User Memory Bank 225 may be cleared (i.e., all zero values) when the RFID tag 205-1 is produced at the factory. In some embodiments, this known value may be assigned to the first state.

The RFID interrogator 125 comprises a RFID reader 235, an antenna 265, and a communication module 270. The RFID reader 235 may use the antenna 265 to transmit and receive RFID signals from the RFID tags 205-1, 205-2, ..., 205-P. Although one antenna 265 and one RFID reader 235 is shown, the RFID interrogator 125 can include any number of antennas 265 and RFID readers 235. For example, the RFID interrogator 125 may include one RFID reader 235 coupled to multiple antennas 265, or multiple RFID readers 235 that are each coupled to a respective antenna 265. For example, one antenna 265 may be arranged to detect RFID-tagged items near the RFID interrogator 125 while another antenna 265 in the same RFID interrogator 125 is arranged to detect RFID-tagged items that are further away from the RFID interrogator 125.

The RFID reader 235 comprises one or more computer processors 240 and a memory 245. The one or more computer processors 240 represent any number of processing elements that each can include any number of processing cores. Some non-limiting examples of the one or more computer processors 240 include a microprocessor, a digital signal processor (DSP), an application-specific integrated chip (ASIC), and a field programmable gate array (FPGA), or combinations thereof. The memory 245 may comprise volatile memory elements (such as random access memory), non-volatile memory elements (such as solid-state, magnetic, optical, or Flash-based storage), and combinations thereof. Moreover, the memory 245 may be distributed across different mediums (e.g., network storage or external hard drives).

As shown, the memory 245 comprises identified tags 250, a tag cache 255, and an attempt counter 260. The RFID reader 235 is configured to determine the identified tags 250 using an interrogation process, which may include transmitting read commands to the RFID tags 205-1, 205-2, ..., 205-P and receiving responses from the RFID tags 205-1, 205-2, ..., 205-P. In some embodiments, the responses from the RFID tags 205-1, 205-2, ..., 205-P comprises a tag reply, and the RFID reader 235 may request identification information from those RFID tags 205-1, 205-2, ..., 205-P that respond to the read command interrogation. The RFID reader 235 may further communicate the identified tags 250 to the tracking system 130 via the network 290.

In some embodiments, the one or more computer processors 240 are configured to interrogate at least the RFID tag 205-1 with a read command comprising a masking value for the predefined portion of the NVM 210 that comprises the state information 230. The masking value corresponds to a non-quiesced state of the RFID tag 205-1 relative to the read command interrogation. Thus, the RFID tag 205-1 will provide a tag reply responsive to the read command only if the state information 230 is the same value as the masking value. Thus, receiving a tag reply from the RFID tag 205-1 indicates that the first RFID tag is in the first state (e.g., the state information 230 is the same value as the masking value). The one or more computer processors 240 may update the identified tags 250 after receiving the tag reply from the RFID tag 205-1. In some embodiments, to ensure that the RFID tag 205-1 does not continue responding during subsequent read command interrogations comprising the masking value, the one or more computer processors 240 may interrogate that RFID tag 205-1 with a write command instructing the RFID tag 205-1 to write a predefined value for a predefined second state to the predefined portion. Stated another way, the RFID tag 205-1 successfully performing the write command updates the state information 230.

Writing the predefined value to the predefined portion places the RFID tag 205-1 in a quiesced state relative to a subsequent read command interrogation comprising the masking value. Assuming the RFID reader 235 continues to apply the same masking value in a subsequent interrogation, the RFID tag 205-1 will not provide a tag reply to the read command. In this way, those RFID tags 205-2, ..., 205-P of interest (e.g., those that have not yet been identified by the RFID reader 235) may be more quickly identified. Beneficially, by masking state information 230 included on the RFID tags 205-1, 205-2, ..., 205-P, the RFID reader 235 may exhibit a performance increase (e.g., an increased number of tag reads per second) during inventorying of up to ten (10) times or more, when compared with inventorying techniques that do not mask state information 230. Further, the RFID reader 235 may exhibit more consistent performance despite increasing numbers of RFID tags 205-1, 205-2, ..., 205-P, when compared with the exponential decay expected for inventorying techniques that do not mask state information 230.

In some embodiments, the RFID reader 235 is configured to apply the same masking value during all inventorying. For example, the RFID reader 235 may be statically positioned (e.g., at a loading zone or other region within a warehouse) and configured to perform a same processing of all RFID tags 205-1, 205-2, ..., 205-P included in the associated read region. In other embodiments, the RFID reader 235 is configured to apply different masking values to support different functionality. For example, the RFID reader 235 may be a worn or carried device, and different masking values may be applied by the RFID reader 235 depending on its location within the warehouse. Continuing the example, a first masking value may be applied when an associate carrying the RFID reader 235 inventories RFID-tagged items included on a first pallet, and a second masking value may be applied when the associate inventories RFID-tagged items included on a second pallet.

In some embodiments, the one or more computer processors 240 awaits an acknowledge signal from the RFID tag 205-1, which confirms that the write command (and thus, the change in the state information 230) was successfully performed by the RFID tag 205-1. Thus, an absence of the acknowledge signal indicates that the RFID tag 205-1 has not successfully performed the write command. In some embodiments, the one or more computer processors 240 are further configured to perform at least a second attempt of interrogating the RFID tag 205-1 with the write command. In some embodiments, the one or more computer processors 240 are further configured to maintain the attempt counter 260 to reflect a number of attempts of interrogating the RFID tag 205-1 with the write command, and to cease interrogating with the write command responsive to the attempt counter 260 reaching a predefined attempt value. For example, the one or more computer processors 240 may be configured to perform three (3) attempts of the write command before ceasing interrogating, although other attempt values are also possible.

In some embodiments, the one or more computer processors 240 are configured to add identification information for the RFID tag 205-1 to the tag cache 255, responsive to determining that the RFID tag 205-1 has not successfully performed the write command. Thus, the tag cache 255 may be updated to reflect those RFID tags 205-1, 205-2, . . . , 205-P that did not successfully perform the write command (or, at least did not return an acknowledge signal to the RFID reader 235). In some embodiments, the tag cache 255 has a last-in, first-out (LIFO) structure, such that the most-recently added RFID tags 205-1, 205-2, . . . , 205-P will have the write command transmitted earlier during later read events. If the write command is successfully written to the RFID tag 205-1 during a later read event, the identification information for the RFID tag 205-1 may be removed from the tag cache 255.

As discussed above, the communication module 270 may transmit the identified tags 250 to the tracking system 135 via the network 290. The communication module 270 has a communication link 295-1 with the network 290, which may represent any suitable wired or wireless connection. In some cases, the network 290 can be a local area network (LAN) or a wide access network (WAN) such as the Internet. For example, the tracking system 135 can be hosted by a computing system (which includes one or more processors and a memory) in the same warehouse as the RFID interrogator 125 or in a remote data center. For example, the tracking system 135 can be an application or service that is hosted in a cloud computing environment which communicates with the RFID interrogator 125 using the network 290.

The tracking system 135 includes the location tracker 140 (e.g., a software application), an item database 275, and a communication module 280. The location tracker 140 may be configured to update the location of the RFID tags 205-1, 205-2, . . . , 205-P (or the associated RFID-tagged items) saved in the item database 275. In some embodiments, the location tracker 140 may update location using one or more parameters derived from signals received from the RFID tags 205-1, 205-2, . . . , 205-P such as a signal strength (e.g., received signal strength indication (RSSI)) or an electrical angle.

A communication module 280 of the tracking system 135 has a communication link 295-2 with the network 290, which may represent any suitable wired or wireless connection. The communication module 280 permits the tracking system 135 to communicate via the network 290 with various RFID interrogators 125 in the warehouse which may be distributed among different areas, or at least corresponding to areas have RFID-tagged items or packages. Further, the communication module 280 may wirelessly communicate with wearable RFID readers which can be transported around the warehouse, e.g., as an associate retrieves and sorts RFID-tagged items or packages.

In some embodiments, an associate may wear a wearable RFID feedback device (not shown) comprising an embedded RFID tag 205. In one non-limiting example, the wearable RFID feedback device is implemented as a smart watch having the RFID tag 205 embedded in a watch band. In such a case, the User Memory Bank included in the RFID tag 205 may store address information for the wearable RFID feedback device (such as a media access control (MAC) address or Internet Protocol (IP) address), and the address information may be used for electronic communication with the wearable RFID feedback device.

In some embodiments, the associate-worn RFID tag 205 may be locked and not able to be overwritten with masking values, so that the RFID tag 205 will not be quiesced when interrogated by a RFID reader 235 with a write command. In such a case, it may be beneficial for the embedded RFID tag 205 to continue responding to interrogations by the RFID reader 235 (e.g., remaining in a non-quiesced state).

Figure 3:
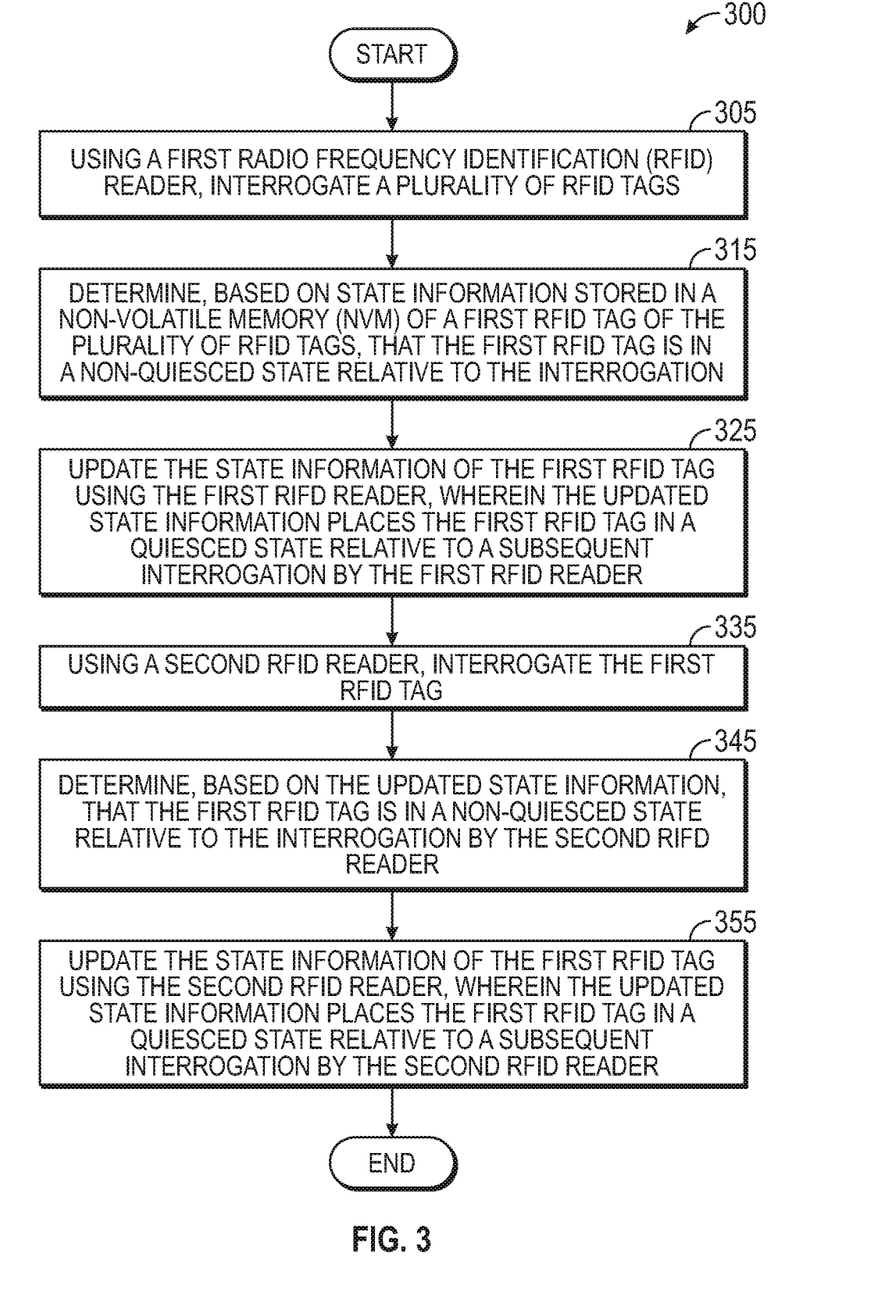
FIG. 3 illustrates an exemplary method of interrogating a plurality of RFID tags using stored state information, according to various embodiments.

FIG. 3 illustrates an exemplary method 300 of interrogating a plurality of RFID tags using stored state information, according to various embodiments. The method 300 may be used in conjunction with other embodiments, such as being performed using the RFID reader 235 of FIG. 2.

The method 300 begins at block 305, where a first RFID reader interrogates a plurality of RFID tags. At block 315, the first RFID reader determines, based on state information stored in a non-volatile memory (NVM) of a first RFID tag of the plurality of RFID tags, that the first RFID tag is in a non-quiesced state relative to the interrogation. At block 325, the first RFID reader updates the state information of the first RFID tag, wherein the updated state information places the first RFID tag in a quiesced state relative to a subsequent interrogation by the first RFID reader. In some embodiments, updating the state information by the first RFID reader comprises writing a value for a quiesced state.

At block 335, a second RFID reader interrogates the first RFID tag. In some embodiments, the second RFID reader has a predefined association with the first state. For example, the second RFID reader may use a masking value corresponding to the value for the first state. At block 345, the second RFID reader determines, based on the updated state information, that the first RFID tag is in a non-quiesced state relative to the interrogation by the second RFID reader. At block 355, the second RFID reader updates the state information of the first RFID tag, wherein the updated state information places the first RFID tag in a quiesced state relative to a subsequent interrogation by the second RFID reader. The method 300 ends following completion of block 355.

Figure 4A:
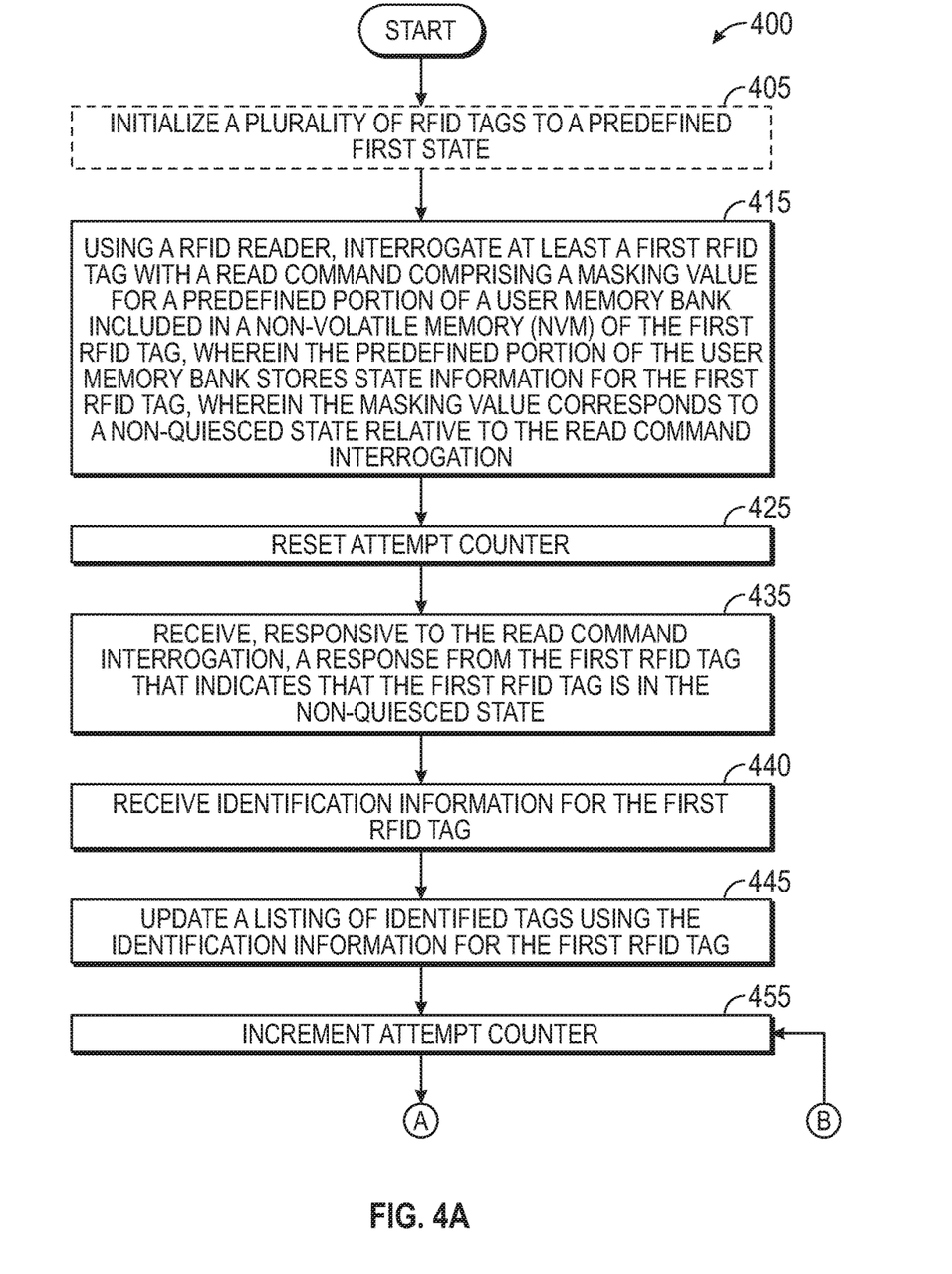
FIGS. 4A and 4B illustrate an exemplary method of interrogating a plurality of RFID tags using state information masking, according to various embodiments.
Figure 4B:
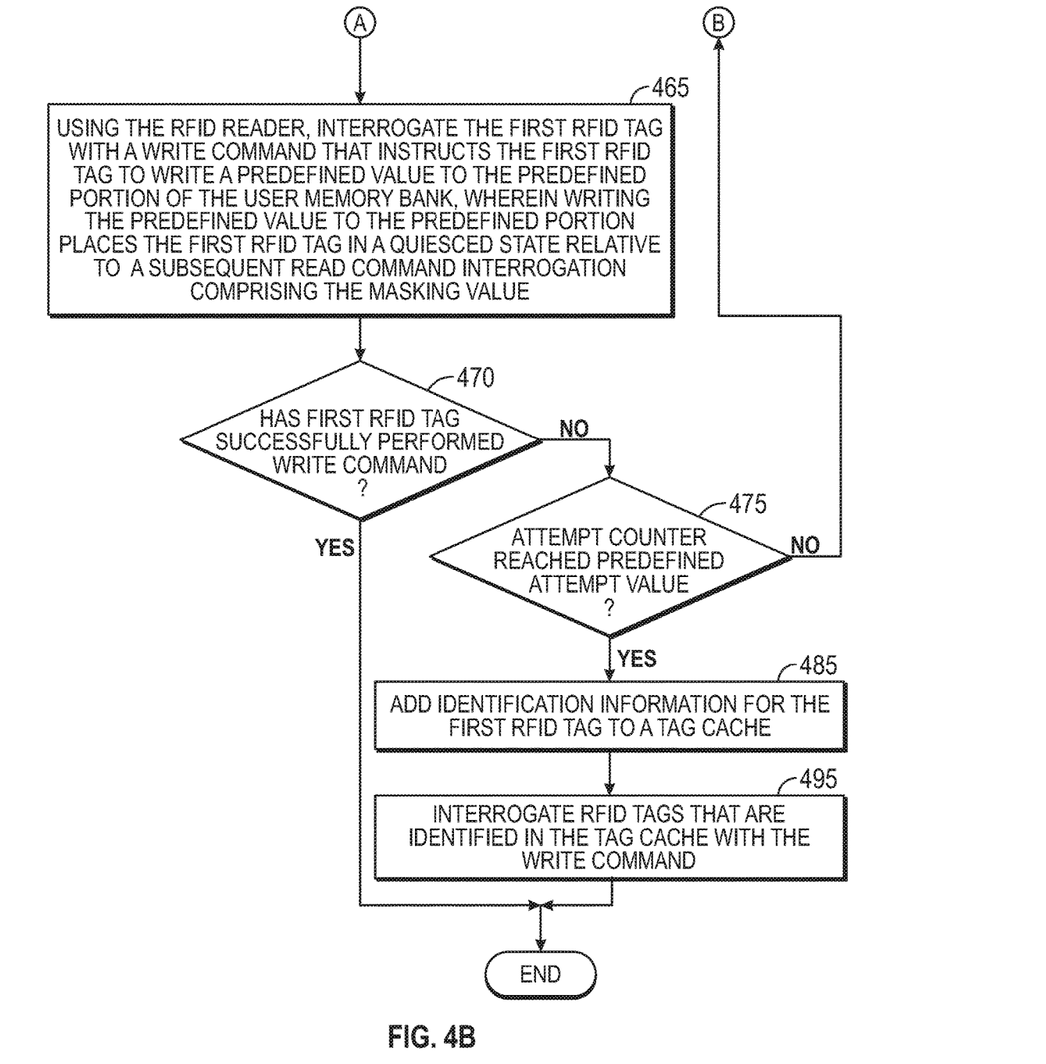

FIGS. 4A and 4B illustrate an exemplary method 400 of interrogating a plurality of RFID tags using state information masking, according to various embodiments. The method 400 may be used in conjunction with other embodiments, such as being performed using the RFID reader 235 of FIG. 2.

The method 400 optionally begins at block 405, where a plurality of RFID tags are initialized to a predefined first state. In some embodiments, the predefined first state corresponds to a default factory setting for the RFID tags.

At block 415, the first RFID reader interrogates at least a first RFID tag with a read command comprising a masking value for a predefined portion of a User Memory Bank included in a non-volatile memory (NVM) of the first RFID tag. The predefined portion of the User Memory Bank stores state information for the first RFID tag. The masking value corresponds to a non-quiesced state relative to the read command interrogation.

At block 425, the first RFID reader resets an attempt counter. At block 435, the RFID reader receives, responsive to the read command interrogation, a response from the first RFID tag that indicates that the first RFID tag is in the non-quiesced state. At block 440, the RFID reader receives identification information for the first RFID tag. At block 445, the RFID reader updates a listing of identified tags using the identification information for the first RFID tag. At block 455, the first RFID reader increments the attempt counter.

At block 465, the first RFID reader interrogates the first RFID tag with a write command that instructs the first RFID tag to write a predefined value to the predefined portion of the User Memory Bank. Writing the predefined value to the predefined portion places the first RFID tag in a quiesced state relative to a subsequent read command interrogation comprising the masking value. At block 470, the first RFID reader determines whether the first RFID tag has successfully performed the write command. If the write command was successful ("YES"), the method 400 ends.

However, if the write command was not successful ("NO"), the method 400 proceeds to block 475, where the first RFID reader determines whether the attempt counter has reached a predefined attempt value. If the attempt counter has not reached the predefined attempt value ("NO"), the method 400 returns to block 455 and increments the attempt counter before transmitting the write command again. However, if the attempt counter has reached the predefined attempt value ("YES"), the method 400 proceeds to block 485 and the first RFID reader adds the identification information for the first RFID tag to a tag cache. At block 495, the first RFID reader interrogates RFID tags that are identified in the tag cache with the write command. The method 400 ends following completion of block 495.

Figure 5:
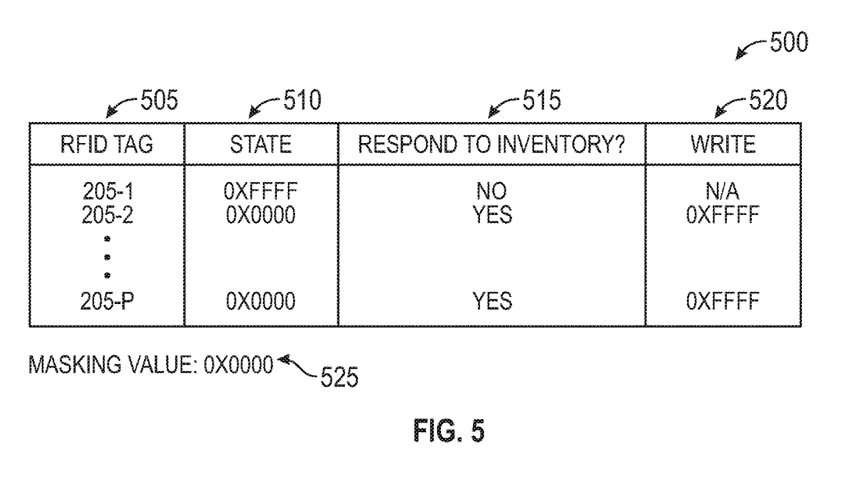
FIG. 5 illustrates an exemplary sequence of interrogating a plurality of RFID tags using a RFID reader, according to various embodiments.

FIG. 5 illustrates an exemplary sequence 500 of interrogating a plurality of RFID tags using a RFID reader, according to various embodiments. The sequence 500 represents one possible data exchange between a plurality of RFID tags 205-1, 205-2, ..., 205-P and a RFID reader. The sequence 500 may be used in conjunction with other embodiments, such as the RFID reader 235 of FIG. 2.

The sequence 500 includes a tag identifier (ID) field 505, a state field 510, a response field 515, and a write value field 520. At the time of interrogating by the RFID reader, the RFID tag 205-1 is in a first (quiesced) state represented by 0xFFFF, and the RFID tags 205-2, 205-P are each in a second (non-quiesced) state represented by 0x0000. Although the state information is shown as being encoded in two (2) bytes, different memory sizes may be used to store the state information.

The RFID reader is configured to interrogate with a read command comprising a masking value 525 of 0x0000 corresponding to the second state. Therefore, the RFID tags 205-2, 205-P will respond to the read command ("YES") and the RFID tag 205-1 will not respond to the read command ("NO"). For example, the RFID tag 205-1 may have been previously identified by the RFID reader in a previous interrogation, and is now quiesced for subsequent interrogations performed by the RFID reader. Once the RFID tags 205-2, 205-P are identified by the RFID reader, the RFID reader writes a value of 0xFFFF to the RFID tags 205-2, 205-P and does not write a value to the RFID tag 205-1. Thus, for a subsequent interrogation performed by the RFID reader, the RFID tags 205-1, 205-2, 205-P will not respond, allowing the RFID reader to more quickly identify unread (or un-interrogated) RFID tags.

Figure 6:
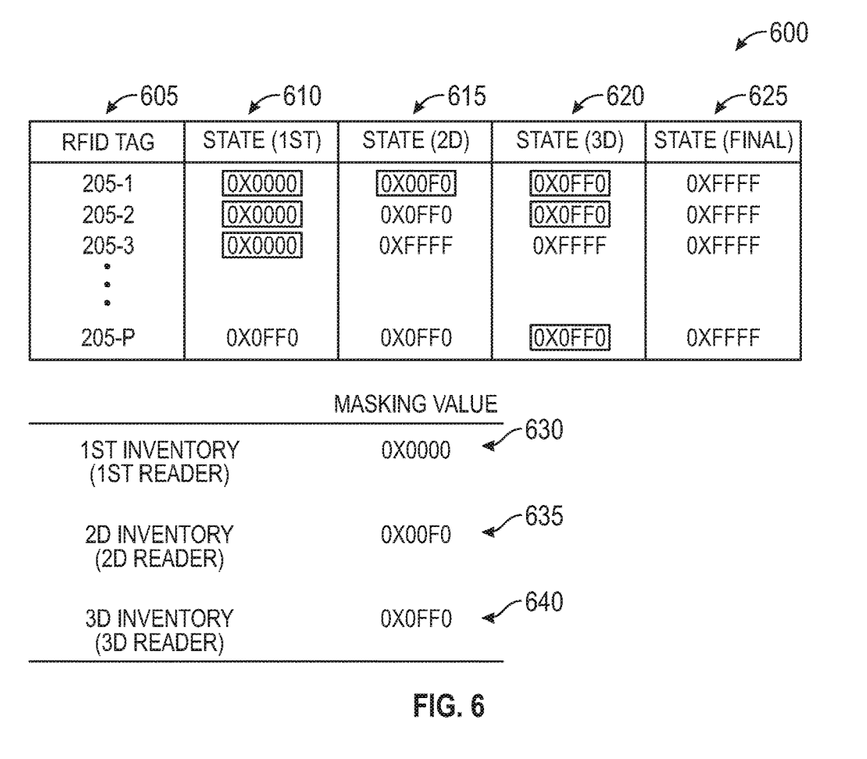
FIG. 6 illustrates an exemplary sequence of interrogating a plurality of RFID tags using a plurality of RFID readers, according to various embodiments.

FIG. 6 illustrates an exemplary sequence 600 of interrogating a plurality of RFID tags using a plurality of RFID readers, according to various embodiments. The sequence 600 represents one possible data exchange between a plurality of RFID tags 205-1, 205-2, ..., 205-P and a plurality of RFID readers. The sequence 600 may be used in conjunction with other embodiments, such as the RFID reader 235 of FIG. 2.

The sequence 600 includes a tag identifier (ID) field 605, a state field 610 during a first interrogation, a state field 615 during a second interrogation, a state field 620 during a third interrogation, and a state field 625 following the final interrogation. In some embodiments, the first interrogation is performed by a first RFID reader applying a masking value 630 of 0x0000, the second interrogation is performed by a second RFID reader applying a masking value 635 of 0x00F0, and the third interrogation is performed by a third RFID reader applying a masking value 640 of 0x0FF0. The first RFID reader, the second RFID reader, and the third RFID reader may be disposed at different locations within a warehouse, and each may represent performing a different operation relative to the plurality of RFID tags 205-1, 205-1, ..., 205-P.

At the time of the first interrogation by the first RFID reader, the RFID tags 205-1, 205-2, 205-3 are each in a first (non-quiesced) state represented by 0x0000 and the RFID tag 205-P is in a second (quiesced) state represented by 0x0FF0. The RFID tags 205-1, 205-2, 205-3 will respond to the first interrogation (as indicated by the boxes surrounding the state information), and the RFID tag 205-P will not respond to the first interrogation. The first RFID reader writes a value of 0x00F0 to the RFID tag 205-1, a value of 0x0FF0 to the RFID tag 205-2, and a value of 0xFFFF to the RFID tag 205-3.

At the time of the second interrogation by the second RFID reader, the RFID tags 205-2, 205-P are each in the second state represented by 0x0FF0, the RFID tag 205-1 is in a third state represented by 0x00F0, and the RFID tag 205-3 is in a fourth state represented by 0xFFFF. The RFID tag 205-1 will respond to the second interrogation (as indicated by the boxes surrounding the state information), and the RFID tags 205-2, 205-3, 205-P will not respond to the second interrogation. The second RFID reader writes a value of 0x0FF0 to the RFID tag 205-1.

At the time of the third interrogation by the third RFID reader, the RFID tags 205-1, 205-2, 205-P are each in the second state represented by 0x0FF0, and the RFID tag 205-3 is in a fourth state represented by 0xFFFF. The RFID tags 205-1, 205-2, 205-P will respond to the third interrogation (as indicated by the boxes surrounding the state information), and the RFID tags 205-3 will not respond to the third interrogation. The third RFID reader writes a value of 0x0FFF to the RFID tags 205-1, 205-2, 205-P.

Thus, RFID readers may be configured to update state information for the different RFID tags 205-1, 205-2, ..., 205-P to have the RFID tags 205-1, 205-2, ..., 205-P processed differently for different interrogations. Further, updating state information differently for the different RFID tags 205-1, 205-2, ..., 205-P may enable other features, such as interrogating a random sample of RFID-tagged items at different stages of processing (e.g., in the warehouse or other suitable environment).

Figure 7:
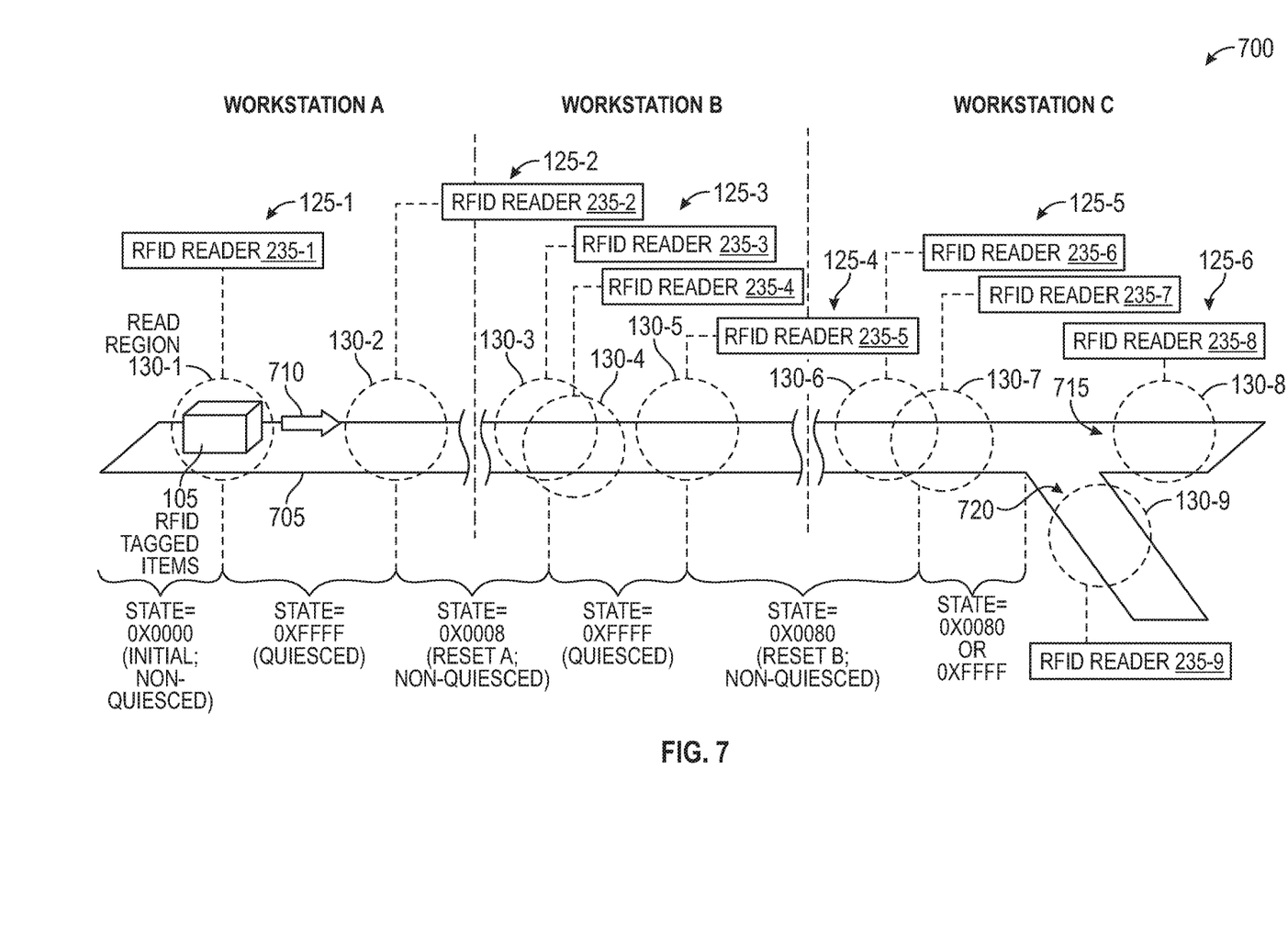
FIG. 7 illustrates an exemplary sequence of processing a plurality of RFID tags at a plurality of workstations, according to various embodiments.

FIG. 7 illustrates an exemplary sequence 700 of processing a plurality of RFID tags at a plurality of workstations, according to various embodiments. The sequence 700 may be used in conjunction with other embodiments, such as the RFID reader 235 of FIG. 2. More specifically, the sequence 700 may represent a manufacturing facility in which component parts are tracked using RFID tags and various functions are performed at each workstation, although other suitable contexts will be apparent to the person of ordinary skill in the art.

In the sequence 700, a plurality of RFID-tagged items 105 are disposed on a conveyor belt 705, which is generally configured to move the plurality of RFID-tagged items 105 in the direction of arrow 710. The plurality of RFID-tagged items 105 are shown at a first workstation (Workstation A), which comprises a first RFID interrogator 125-1 having a RFID reader 235-1, and a second RFID interrogator 125-2 having a RFID reader 235-2.

At Workstation A, the RFID-tagged items 105 have state information with a value of 0x0000, which may represent an initial state of the RFID-tagged items 105 such as a default factory setting. The value of 0x0000 may represent a non-quiesced state. When the RFID-tagged items 105 are within the read region 130-1, the RFID reader 235-1 interrogates the plurality of RFID-tagged items 105 by interrogating the plurality of RFID-tagged items 105 with a read command having a masking value of 0x0000, and by writing a value of 0xFFFF to the plurality of RFID-tagged items 105. The value of 0xFFFF may represent a quiesced state, in which the RFID tags of the RFID-tagged items 105 do not respond to subsequent read command interrogations by the RFID reader 235-1 using the same masking value.

When the RFID-tagged items 105 are moved by the conveyor belt 705 to the read region 130-2 corresponding to the RFID reader 235-2, the RFID reader 235-2 interrogates the plurality of RFID-tagged items 105 with a read command having a masking value of 0xFFFF, and writes a value of 0x0008 to "reset" the state information of the plurality of RFID-tagged items 105 into a non-quiesced state.

A second workstation (Workstation B) comprises a third RFID interrogator 125-3 having two RFID readers 235-3, 235-4, and comprises a fourth RFID interrogator 125-4 having a RFID reader 235-5. When the RFID-tagged items 105 are within the read regions 130-3 or 130-4, the RFID readers 235-3, 235-4 interrogate the plurality of RFID-tagged items 105 by interrogating the plurality of RFID-tagged items 105 with a read command having a masking value of 0x0008 (corresponding to the Reset A value set at Workstation A), and by writing a value of 0xFFFF to the plurality of RFID-tagged items 105. As before, the value of 0xFFFF may represent a quiesced state, in which the RFID tags of the RFID-tagged items 105 do not respond to subsequent read command interrogations by the RFID readers 235-3, 235-4 using the same masking value.

When the RFID-tagged items 105 are moved by the conveyor belt 705 to the read region 130-5 corresponding to the RFID reader 235-5, the RFID reader 235-5 interrogates the plurality of RFID-tagged items 105 with a read command having a masking value of 0xFFFF, and writes a value of 0x0080 to "reset" the state information of the plurality of RFID-tagged items 105 into a non-quiesced state. As shown, the reset value (Reset B) written at Workstation B differs from that of the reset value (Reset A) written at Workstation A. However, the reset values may be the same at different workstations in another implementation. By applying different reset values at different workstations, the RFID tags may be effectively encoded with process location information in the User Memory Bank. For example, in case that a particular RFID tag does not successfully complete the manufacturing process illustrated in the sequence 700, the process location information may be used for diagnostic purposes. Further, in alternate implementations, the value corresponding to a quiesced state may be different for different workstations, which may also provide process location information.

A third workstation (Workstation C) comprises a fifth RFID interrogator 125-5 having two RFID readers 235-6, 235-7, a sixth RFID interrogator 125-6 having a RFID reader 235-8, and a seventh RFID interrogator 125-7 having a RFID reader 235-9. When the RFID-tagged items 105 are within the read region 130-6, the RFID reader 235-6 interrogates the plurality of RFID-tagged items 105 by interrogating the plurality of RFID-tagged items 105 with a read command having a masking value of 0x0080 (corresponding to the Reset B value set at Workstation B). The RFID reader 235-7 interrogates the plurality of RFID-tagged items 105 in the read region 130-7 with a read command having a different masking value than that of RFID reader 235-6 (for example, 0x0008 corresponding to the Reset A value).

In some embodiments, the result of the interrogations by the RFID readers 235-6, 235-7 can be used to direct the plurality of RFID-tagged items 105 according to different paths along the conveyor belt 705. For example, if a number of RFID-tagged items 105 having the different masking value (e.g., 0x0008) exceeds a threshold level, it may be indicative of an issue occurring with the RFID tags or at a particular workstation in the manufacturing process. In this way, the plurality of RFID-tagged items 105 may be directed along a path 720 (toward the read region 130-9) for diagnostic reasons. However, if the number of RFID-tagged items 105 corresponding to the different masking value is less than the threshold level, the plurality of RFID-tagged items 105 may be directed along a path 715 toward the read region 130-8.

In some embodiments, an associate may wear a wearable RFID reader (not shown) comprising a RFID tag. In such a case, it may be beneficial for the second RFID tag 205 to continue responding (e.g., remaining in a non-quiesced state) regardless of the associate's location in the manufacturing facility. Thus, responsive to determining that a value stored in the predefined portion of the wearable RFID reader corresponds to the non-quiesced state relative to the read command interrogation, one of the RFID readers 235-1, 235-2, . . . , 235-9 may interrogate the RFID tag of the wearable RFID reader with a lock command.

In some embodiments, an associate may wear a wearable RFID feedback device (not shown) comprising an embedded RFID tag. In one non-limiting example, the wearable RFID feedback device is implemented as a smart watch having the embedded RFID tag embedded in a watch band. In such a case, the User Memory Bank included in the embedded RFID tag may store address information for the wearable RFID feedback device (such as a media access control (MAC) address or Internet Protocol (IP) address), and the address information may be used for electronic communication with the wearable RFID feedback device.

In some embodiments, the embedded RFID tag may be locked and not able to be overwritten with masking values, so that the embedded RFID tag will not be quiesced when interrogated by one or more of the RFID readers 235-1, 235-2, . . . , 235-9 with a write command. In such a case, it may be beneficial for the embedded RFID tag to continue responding to interrogations by the RFID readers 235-1, 235-2, . . . , 235-9 (e.g., remaining in a non-quiesced state).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used to implement embodiments of the disclosure. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
using a radio frequency identification (RFID) reader, interrogating at least a first RFID tag with a read command comprising a masking value for a predefined portion of a User Memory Bank included in a non-volatile memory (NVM) of the first RFID tag, wherein the predefined portion of the User Memory Bank stores state information for the first RFID tag, wherein the masking value corresponds to a non-quiesced state relative to the read command interrogation;
receiving, responsive to the read command interrogation, a response from the first RFID tag that indicates that the first RFID tag is in the non-quiesced state;
receiving identification information for the first RFID tag;
updating a listing of identified tags using the identification information for the first RFID tag; and
using the RFID reader, interrogating the first RFID tag with a write command that instructs the first RFID tag to write a predefined value to the predefined portion of the User Memory Bank,
wherein writing the predefined value to the predefined portion places the first RFID tag in a quiesced state relative to a subsequent read command interrogation comprising the masking value.

2. The method of claim 1, wherein a second RFID tag has a value in the predefined portion such that the second RFID tag is in quiesced state relative to the read command interrogation comprising the masking value.

3. The method of claim 1, further comprising:
determining that the first RFID tag has not successfully performed the write command responsive to a first attempt of interrogating the first RFID tag with the write command; and
performing at least a second attempt of interrogating the first RFID tag with the write command.

4. The method of claim 3, further comprising:
maintaining an attempt counter to reflect a number of attempts of interrogating the first RFID tag with the write command; and
responsive to the attempt counter reaching a predefined attempt value, ceasing interrogating the first RFID tag with the write command.

5. The method of claim 3, wherein the first attempt of interrogating the first RFID tag with the write command occurs during a first read event, the method further comprising:
responsive to determining that the first RFID tag has not successfully performed the write command during the first read event, adding the identification information for the first RFID tag to a tag cache; and
during a second read event, interrogating RFID tags that are identified in the tag cache with the write command.

6. The method of claim 1, further comprising:
using another RFID reader, writing a predefined value corresponding to the non-quiesced state to the predefined portion before interrogating the first RFID tag with the read command.

7. The method of claim 1, wherein a wearable RFID feedback device comprises a second, embedded RFID tag that is locked in a non-quiesced state relative to interrogations performed by the RFID reader.

8. The method of claim 1, wherein the RFID reader is communicatively coupled with a tracking system via a network, the method further comprising:
transmitting the updated listing of identified tags to the tracking system.

9. A method comprising:
using a first radio frequency identification (RFID) reader, interrogating a plurality of RFID tags;
determining, based on state information stored in a non-volatile memory (NVM) of a first RFID tag of the plurality of RFID tags, that the first RFID tag is in a non-quiesced state relative to the interrogation; and
updating the state information of the first RFID tag using the first RFID reader, wherein the updated state information places the first RFID tag in a quiesced state relative to a subsequent interrogation by the first RFID reader.

10. The method of claim 9, wherein the state information is stored in a User Memory Bank of the NVM.

11. The method of claim 9, wherein interrogating the plurality of RFID tags comprises:
interrogating with a read command comprising a masking value for a predefined portion of the NVM, where the predefined portion stores the state information of the first RFID tag.

12. The method of claim 9, wherein updating the state information of the first RFID tag is a first instance, the method further comprising:
using a second RFID reader, interrogating the first RFID tag;
determining, based on the updated state information, that the first RFID tag is in a non-quiesced state relative to the interrogation by the second RFID reader; and
updating the state information of the first RFID tag using the second RFID reader, wherein the updated state information places the first RFID tag in a quiesced state relative to a subsequent interrogation by the second RFID reader.

13. The method of claim 12, wherein updating the state information using the first RFID reader comprises writing a predefined value for the quiesced state, and
wherein writing the predefined value places the first RFID tag in a non-quiesced state relative to a subsequent interrogation by a second RFID reader.

14. A radio frequency identification (RFID) reader device comprising:
one or more computer processors configured to:
interrogate, with a read command, at least a first RFID tag comprising a non-volatile memory (NVM), the read command comprising a masking value for a predefined portion of the NVM, wherein the predefined portion stores state information for the first RFID tag, wherein the masking value corresponds to a predefined first state;
receive a response from the first RFID tag that indicates that the first RFID tag is in the first state; and
interrogate the first RFID tag with a write command that instructs the first RFID tag to write a predefined value for a predefined second state to the predefined portion.

15. The RFID reader device of claim 14, wherein a second RFID tag has a value in the predefined portion such that the second RFID tag is in a quiesced state relative to the read command interrogation.

16. The RFID reader device of claim 14, wherein the one or more computer processors are further configured to:
determine that the first RFID tag has not successfully performed the write command responsive to a first attempt of interrogating the first RFID tag with the write command; and
perform at least a second attempt of interrogating the first RFID tag with the write command.

17. The RFID reader device of claim 16, further comprising:
a memory coupled with the one or more computer processors and comprising an attempt counter,
wherein the one or more computer processors are further configured to:
maintain the attempt counter to reflect a number of attempts of interrogating the first RFID tag with the write command; and
responsive to the attempt counter reaching a predefined attempt value, cease interrogating the first RFID tag with the write command.

18. The RFID reader device of claim 16, wherein the first attempt of interrogating the first RFID tag with the write command occurs during a first read event, the RFID reader device further comprising:
a memory coupled with the one or more computer processors and comprising a tag cache,
wherein the one or more computer processors are further configured to:
responsive to determining that the first RFID tag has not successfully performed the write command during the first read event, add identification information for the first RFID tag to the tag cache; and
during a second read event, interrogating RFID tags that are identified in the tag cache with the write command.

19. The RFID reader device of claim 14, wherein the predefined first state corresponds to a default factory setting of the first RFID tag.

20. The RFID reader device of claim 14, wherein the predefined portion is included in a User Memory Bank of the NVM.

* * * * *